United States Patent [19]

Bushnell

[11] Patent Number: 5,255,315
[45] Date of Patent: Oct. 19, 1993

[54] METHOD OF REROUTING TELECOMMUNICATIONS TRAFFIC

[75] Inventor: William J. Bushnell, St. Charles, Ill.

[73] Assignee: AT&T Bell Laboratories, Murray Hill, N.J.

[21] Appl. No.: 725,944

[22] Filed: Jun. 27, 1991

Related U.S. Application Data

[63] Continuation-in-part of Ser. No. 691,578, Apr. 24, 1991, abandoned.

[51] Int. Cl.$^5$ .................... H04M 7/00; H04M 3/42
[52] U.S. Cl. .................... 379/221; 379/207; 379/211; 379/230
[58] Field of Search ............... 379/201, 207, 210, 211, 379/212, 221, 230, 220

[56] References Cited

U.S. PATENT DOCUMENTS

| | | | |
|---|---|---|---|
| 4,191,860 | 3/1980 | Weber | 179/18 B |
| 4,310,727 | 1/1982 | Lawser | 379/207 |
| 4,313,035 | 1/1982 | Jordan et al. | 379/230 X |
| 4,348,554 | 9/1982 | Asmuth | 379/221 |
| 4,460,807 | 7/1984 | Kerr et al. | 179/18 BC |
| 4,896,350 | 1/1990 | Bicknell et al. | 379/220 |

OTHER PUBLICATIONS

L. J. Gawron et al., "No. 1/1A ESS-SPC Network Capabilities and Signaling Architecture", *The Bell System Technical Journal*, vol. 61, No. 7, Sep. 1982, pp. 1611-1636.

*Primary Examiner*—James L. Dwyer
*Assistant Examiner*—Harry S. Hong
*Attorney, Agent, or Firm*—Werner Ulrich

[57] ABSTRACT

This invention relates to a method of establishing connections over a public switched telephone network to a customer whose telephone number is in a block associated, for routing purposes, with a first telephone switching system, but who is actually served by a second telephone switching system. The facility for carrying out this method is desirable in order to serve customers who need the advanced functions of a digital switching system, who are currently served by an analog switching system, and do not wish to have their telephone number changed when they switch to being served by the digital switching system. In accordance with the invention, a common channel signaling initial address message is sent to the first system. The first system translates the telephone number of that initial address message and finds that the customer for that telephone number is now served by a second switch. The first switch then sends a release message containing the identification of the second switch back to the source of the initial address message. The source of the first initial address message then sends a second initial address message to the identified second switch and the call connection can now be established to the customer served by the second switch. During the time the customer is being moved from the first switch to the second switch, one of the two returns a "temporarily out of service" type of announcement.

10 Claims, 3 Drawing Sheets

SUBTENDING SWITCH PROCESSING

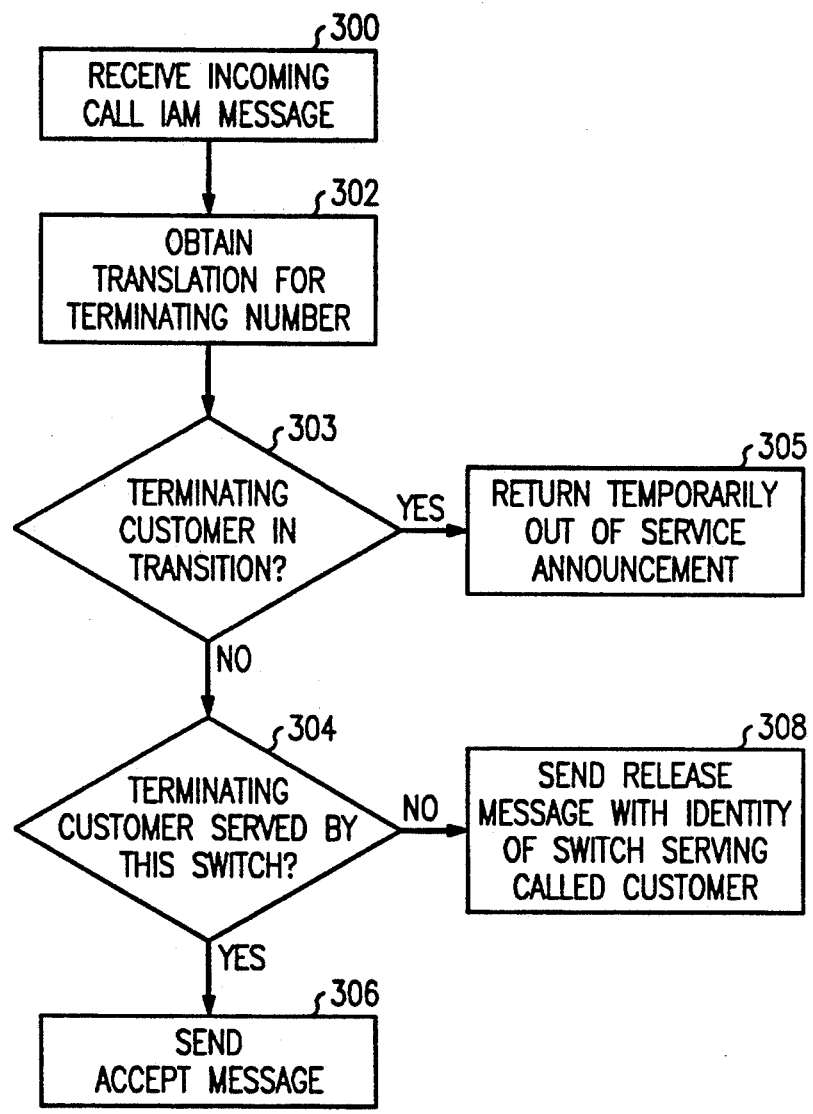

METHOD OF REROUTING TELECOMMUNICATIONS TRAFFIC

This application is a continuation-in-part of application Ser. No. 691,578, filed on Apr. 24, 1991, now abandoned.

TECHNICAL FIELD

This invention relates to telecommunications networks and, more specifically, to routing calls in such networks.

PROBLEM

During the last decade, a large number of digital switches have been introduced into the local and toll telephone switching plant in the United States. At the same time, a large number of customers continued to be served by the older analog switches, such as the 1A ESS TM switches manufactured by AT&T Network Systems. In the past when customers have wanted to have features offered only by digital switches, such as the 5ESS ® switch manufactured by AT&T Network Systems, they have been transferred to such switches. At present, such a transfer is inevitably accompanied by a change of the customer's directory number, since each switch serves one or more blocks of such numbers and when a customer with a particular number is transferred out of one switch to be served by a second switch, his number is not in one of the blocks of numbers of that second switch. It would be possible to route all traffic to that customer through the first switch, but such an arrangement would be very expensive, since it would continue indefinitely to require a double switching operation in order to be connected to that customer and would require the use of additional plant facilities interconnecting the two switches. On the other hand, many customers are very unhappy about having their telephone number changed because their number is widely known, is on their stationery, and all of their customers and other contacts must be notified of the change. Furthermore, a number change is expensive for a telephone operating company, since calls to the old number must be intercepted and the callers be provided with the new telephone number.

Accordingly, a problem of the prior art is that there is no satisfactory arrangement for transferring customers being served by a first switch to a second switch for service by that switch without undesirably changing their telephone number. Further, there is no good solution to the problem of notifying callers during the time of transition of the customer being moved.

SOLUTION

In accordance with the principles of this invention, an advance is made over the prior art through the use of a new method for establishing calls to customers having a number in a first switch but being served from a second switch by transmitting a call setup message from a subtending switch to the first switch in accordance with the assumed routing of the call, based on the customer's telephone number which is in a block served by the first switch and making a translation in that first switch to identify a second switch for serving the call and returning a release message, the release message including the identity of the second switch, for example, in the cause field so that the initial setup message can be routed instead to the second switch. A subtending switch is one which sends traffic to the first or second switch without going through any intermediate switches. In response to receipt of the release message, the subtending switch routes the call to the second switch. The call is not completed to the first switch; only the initial setup message is completed to that switch. Advantageously, such an arrangement permits the call to be connected to the second switch without ever connecting it to the first switch at the small expense of initially sending the setup message to the first switch and responding to the release message from the first switch be redirecting the setup message and the call. Advantageously, only small changes need to be made to the many subtending switches, which may route traffic to the first and second switch. The reject message might alternatively simply indicate that another switch serves the terminating customer, and the subtending switch would know the identity of that other switch.

In accordance with one embodiment of the invention, a signaling network comprising one or more signal transfer points is used for transporting the signaling messages between switches. The release message is sent via the signaling network to the subtending switch which transmitted the setup message. The subtending switch then reads the identification of the second switch in the release message and redirects both the setup message and the call to that second switch.

In accordance with one aspect of this invention, customers from a particular first switch may be transferred to one of a plurality of second switches. The identification of that second switch is stored in a translation for the directory number of the transferred customer in the first switch.

In accordance with another aspect of the invention, while the customer is being moved, the switch from which the customer is being moved returns an announcement to the caller informing the caller that the line is temporarily out of service.

BRIEF DESCRIPTION OF THE DRAWING

FIGS. 2 and 3 are flow diagrams of steps performed by switching systems of a network for practicing the invention.

DETAILED DESCRIPTION

Figure 1:
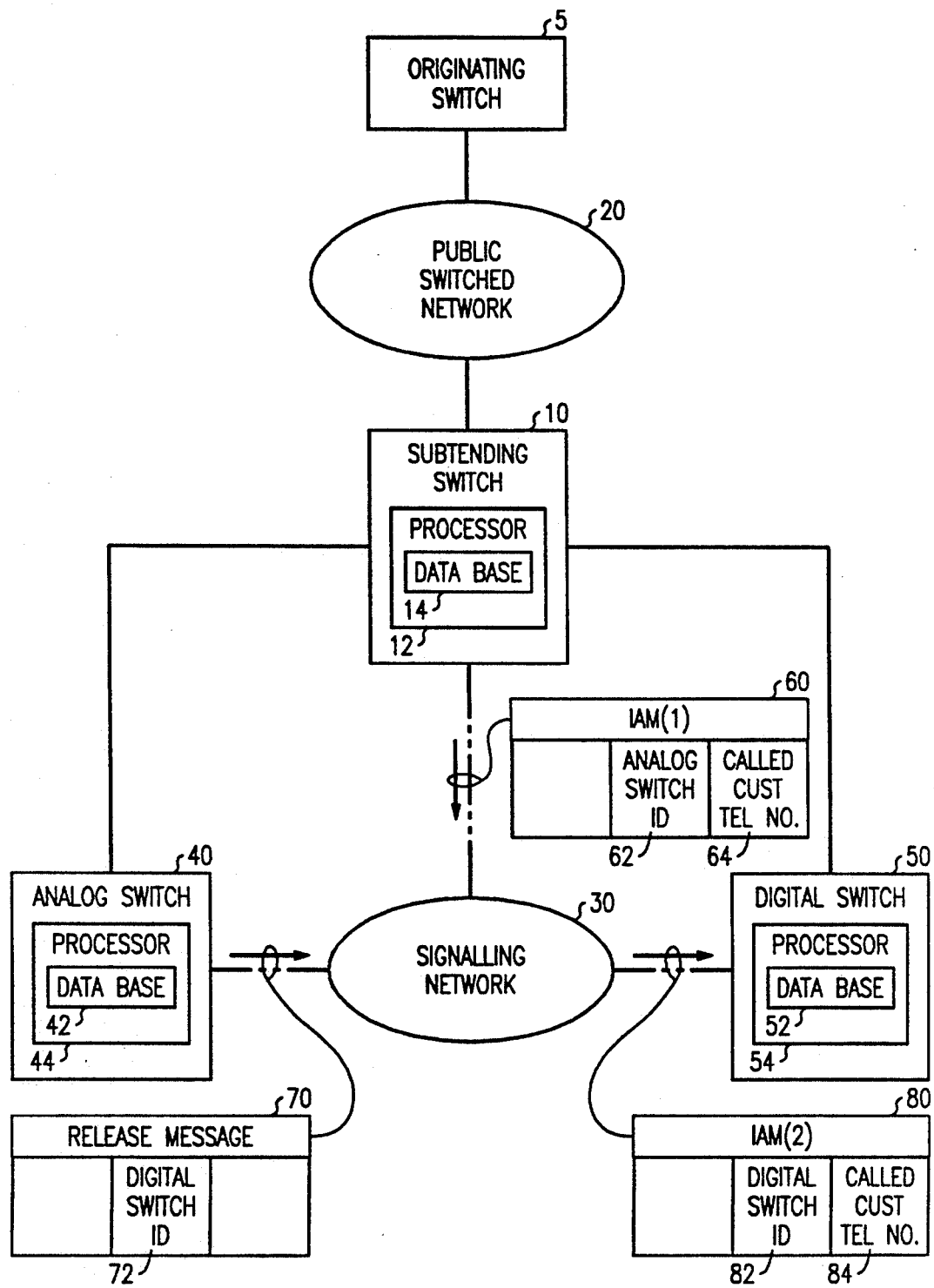
FIG. 1 is a block diagram of a system for practicing the invention.

FIG. 1 is a diagram of an arrangement for implementing applicant's invention. A call from a customer connected to originating switch 5 is connected via public switched network to subtending switch 10, comprising processor 12 including a data base 14, from whence it is directed to a customer served by digital switch 50. However, the customer's number is part of a block that is served by analog switch 40. Therefore, a setup message, an initial address message 1 (message 60) comprising an identification 62 of the destination of the message and the called customer telephone number 64 is transmitted from the subtending switch over the signaling network 30 to analog switch 40. Analog switch 40 includes a processor 42 with access to a data base 44. Upon receipt of message 60, processor 42 queries data base 44 for a directory number translation for the directory number as part of message 60. The result of this data base query is an indication that customer of this directory number is not served by switch 40 but is instead served by switch 50, having a processor means 52 including a data base 54. Processor 42 therefore prepares a release message 70 which contains the message identification of the initial address message with the identification of digital switch 50 in segment 72 of the release message, for example, in the cause field. This release message is sent back to the subtending switch which then generates initial address message 80 comprising an identification 82 of the destination of the message and the called customer telephone number 84 for transmission by signaling network 30 to digital switch 50. Upon receiving an acknowledgment from digital switch 50, the subtending switch proceeds to complete the establishment of the voice path for the call. The number of adaptations which must be made to existing systems in order to carry out this method are relatively few in number. First, the subtending switch which sends out initial address messages must be adapted to respond to release messages giving alternate switch identifications by retransmitting the initial address message with a new destination. The identity of the alternate switch may be transmitted, for example, in the "reason for release" field of the release message. Second, the translations of switches which may have served customers who are now being served by other switches without a telephone number change must be augmented to recognize the class of service that a particular telephone number is not served by this switch but is served instead by another switch whose identity is stored in the translation. The switches, of course, must be adapted to generate release messages for transmission back to the subtending switches. Finally, switches such as digital switch 50 must have their directory number translations augmented to include translations for routing isolated numbers, i.e., numbers that are not part of the basic blocks which they serve, to intercept.

Figure 2:
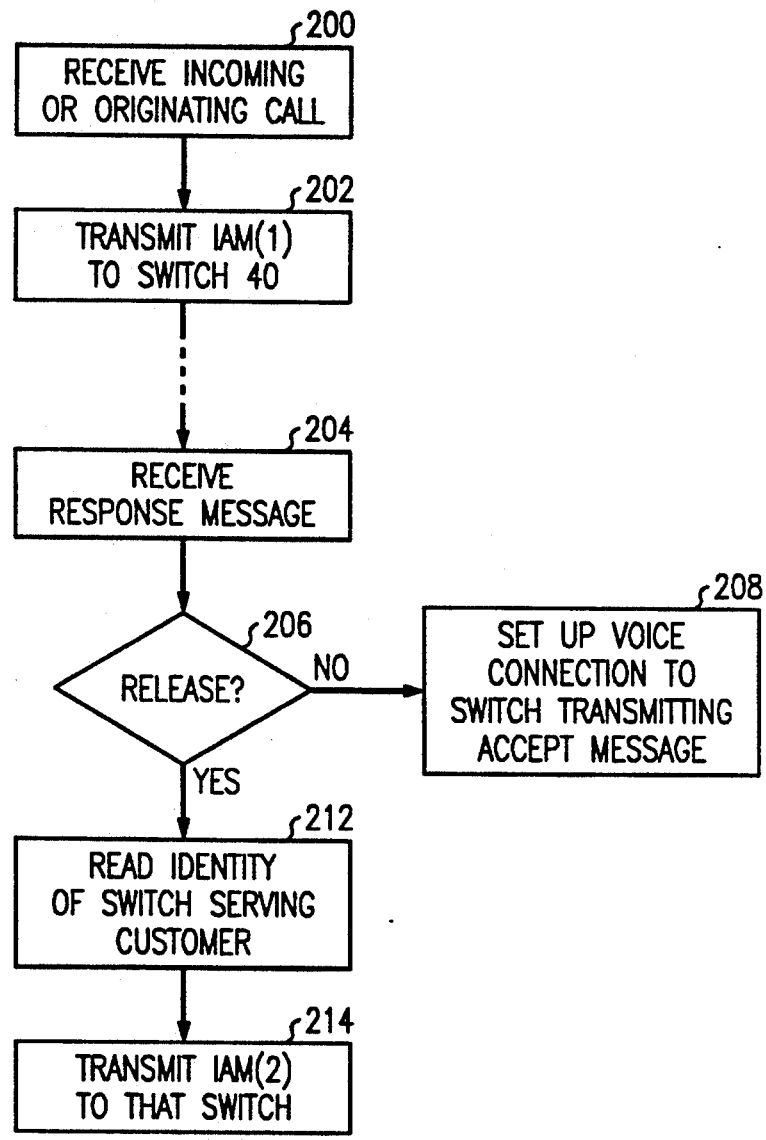

FIG. 2 is a flow diagram of actions performed in a subtending office. A subtending office receives an incoming or originating call (action block 200) and transmits an initial address message 1 to switch 40 (action block 202). Switch 40 is the switch designated in the routing translations of the subtending office as the switch to which the initial address message is to be transmitted. The subtending switch waits for a response message which it receives, after a lapse of time (action block 204). Test 206 determines whether the received response message is a reject message. If not, then the normal steps are taken to set up a voice connection to the switch identified in the accept message. If this is a release message, then the subtending switch reads the identity of the switch serving the customer from the release message (action block 212) and transmits the new initial address message (IAM (2)) to that switch (action block 214). If the received message is neither an accept message nor a release message, then the subtending switch simply returns overflow tones to the calling customer (action block 216).

FIG. 3 is a flow diagram of actions performed in the end switch. The end switch receives an incoming call IAM message (action block 300), and obtains translation data for the terminating number of that IAM message (action block 302). Test 303 checks whether the customer is in transition from this switch to another; if so, a "Temporarily out of service" announcement is returned (action block 305). If not, then in test 304, this translation data is examined to determine the identity of the switch which serves that terminating customer. If test 304 indicates that the terminating customer is served by this switch, then an accept message is returned to the subtending switch which sent them the IAM message (action block 306, the normal procedure). If the terminating customer is not served by this switch, then a release message is sent with the identity of the switch serving the called customer back to the subtending switch which sent the IAM message. The announcement of block 305 and the test for determining whether the announcement is to be applied can also be performed in the end switch to which the called customer has been reassigned.

While this illustrative embodiment shows arrangements for terminating calls to either an analog switch or a digital switch, the same arrangements can be used to either terminate to any type of program controlled switch or to one of a plurality of other switches. Further, if the other switches are not equipped to accept CCS signals, the subtending switch may complete to the other switches using signaling arrangements such as multi-frequency signaling. The digital switch could act as the switch receiving IAM (1) in this case.

In this example, the subtending switch is reached from an originating switch via a public switched network. In other cases, the call will originate at the subtending switch so that the connection from originating switch to subtending switch is not necessary. The analog and digital switches must also be provided with translation capability for recognizing that calls originated in one of these switches may be terminated in the digital or the analog switch, and for completing such calls appropriately.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of establishing a telephone call connection to a customer, served by a first telephone switching system for switching telephone communication traffic or a second telephone switching system for switching telephone communication traffic, whose telephone number is one of a block served by said second telephone switching system, the method comprising the steps of:

transmitting a first setup message from a third telephone switching system for switching telephone communication traffic of a public switched network to the second telephone switching system;

responsive to receiving said first setup message, determining which telephone switching system serves said customer identified by said telephone number;

if said determining indicates that said customer is served by said second telephone switching system, establishing a connection to said customer in said second telephone switching system;

if said determining indicates that said customer is served by said first telephone switching system, transmitting a release message, the release message comprising the identification of the first telephone switching system, to the third telephone switching system; and responsive to receiving said release message, transmitting a second setup message from the third telephone switching system to the first telephone switching system for establishing a call connection from the third telephone switching system, to the first telephone switching system.

2. The method of claim 1 wherein said transmitting steps comprise the steps of transmitting over a data network.

3. The method of claim 2 wherein said data network is a common channel signaling network.

4. The method of claim 3 wherein said common channel signaling network comprises a plurality of signal transfer points.

5. The method of claim 1 wherein said setup messages are initial address messages.

6. The method of claim 1 wherein said step of transmitting a release message comprises the steps of:
    translating a telephone number received in said first setup message to fetch data for said telephone number;
    determining whether said data comprises data indicating that said telephone number is served by a telephone switching system other than said second telephone switching system; and
    if said determination indicates that said telephone is served by a telephone switching system other than said second telephone switching system, formulating a release message comprising the identification of said telephone switching system other than said second telephone switching system.

7. The method of claim 1 wherein said first, second, and third telephone switching systems are part of a public switched network.

8. The method of claim 1 further comprising the steps of:
    testing whether service to the telephone number has already been activated in said first telephone switching system, and, if not, returning an announcement to a caller of said call.

9. A method of establishing a telephone call connection to a customer, served by a first telephone switching system for switching telephone communication traffic or a second telephone switching system for switching telephone communication traffic, whose telephone number is one of a block served by said second telephone switching system, the method comprising the steps of:
    transmitting a first setup message from a third telephone switching system for switching telephone communication traffic of a public switched network to the second telephone switching system;
    responsive to receiving said first setup message, determining which telephone switching system serves said customer identified by said telephone number;
    if said determining indicates that said customer is served by said second telephone switching system, establishing a connection to said customer in said second telephone switching system;
    if said determining indicates that said customer is served by said first telephone switching system, transmitting to the third telephone switching system a release message, the release message comprising data for identifying the first telephone switching system; and
    responsive to receiving said release message, transmitting a second setup message from the third telephone switching system to the first telephone switching system for establishing a call connection from the third telephone switching system, to the first telephone switching system.

10. A method of establishing a telephone call connection to a customer, served by a first telephone switching system for switching telephone communication traffic or a second telephone switching system for switching telephone communication traffic, whose telephone number is one of a block served by said second telephone switching system, the method comprising the steps of:
    transmitting a first setup message from a third telephone switching system for switching telephone communication traffic of a public switched network to the second telephone switching system;
    responsive to receiving said first setup message, determining which telephone switching system serves said customer identified by said telephone number;
    if said determining indicates that said customer is served by said second telephone switching system, establishing a connection to said customer in said second telephone switching system;
    if said determining indicates that said customer is served by said first telephone switching system, transmitting to the third telephone switching system a release message, the release message comprising data for identifying that said customer has been moved from said second telephone switching system to said first telephone switching system; and
    responsive to receiving said release message, transmitting a second setup message from the third telephone switching system to the first telephone switching system for establishing a call connection from the third telephone switching system, to the first telephone switching system.

* * * * *